United States Patent [19]

Völling

[11] 4,067,954

[45] Jan. 10, 1978

[54] PROCESS FOR THE PRODUCTION OF FINELY DIVIDED SILICON DIOXIDE HAVING A LARGE SPECIFIC SURFACE

[75] Inventor: Axel Völling, Rheinfelden, Germany

[73] Assignee: Deutsche Gold- und Silber-Scheideanstalt vormals Roessler, Frankfurt am Main, Germany

[21] Appl. No.: 652,459

[22] Filed: Jan. 26, 1976

Related U.S. Application Data

[63] Continuation of Ser. No. 497,001, Aug. 12, 1974, abandoned, which is a continuation of Ser. No. 251,877, May 10, 1972, abandoned.

[30] Foreign Application Priority Data

May 11, 1971 Germany .............................. 2123233

[51] Int. Cl.$^2$ ............................................ C01B 33/18
[52] U.S. Cl. ........................................ 423/336; 423/337
[58] Field of Search ............................ 423/336, 337, 325

[56] References Cited

U.S. PATENT DOCUMENTS 3,660,025  5/1972  Driscoll .............................. 423/336
3,772,427  11/1973  Moore ................................ 423/337

FOREIGN PATENT DOCUMENTS 1,041,484  10/1958  Germany ............................ 423/337
1,121,279  7/1968  United Kingdom ................ 423/337

Primary Examiner—Jack Cooper
Attorney, Agent, or Firm—Beveridge, DeGrandi, Kline & Lunsford

[57] ABSTRACT

Process for the production of finely divided silicon dioxide having a surface of more than about 380 m$^2$/g BET which comprises converting a volatile silicon halide in an inert gas vehicle with a gas forming water upon combustion and oxygen gas or air in a flame, the quantity of oxygen being sufficient for the practically complete combustion of the combustible gas, and the quantities of oxygen or air and combustible gas being sufficient to produce a quantity of water which will at least suffice for the hydrolysis of the volatile silicon halide, said volatile silicon halide consisting essentially of trichlorosilane and said inert gas vehicle consisting for instance of nitrogen, carbon dioxide, noble gases or others, the amount of trichlorosilane vapor being about 410–565 g trichlorosilane vapor per Nm$^3$/h total gas, the molar ratio of trichlorosilane vapor to nitrogen being about 0.5:1 – 5:1, the molar ratio of hydrogen in the combustible gas to oxygen being about 0.5:1 – 1.3:1, and separating the resulting silicon dioxide from other reaction products. Finely divided silicon dioxide prepared according to this process is also provided. The finely divided silicon dioxide is useful as a thickening agent in liquid systems.

11 Claims, No Drawings

PROCESS FOR THE PRODUCTION OF FINELY DIVIDED SILICON DIOXIDE HAVING A LARGE SPECIFIC SURFACE

This is a continuation of application Ser. No. 497,001 filed Aug. 12, 1974, which is a continuation of application Ser. No. 251,877, filed May 10, 1972 both now abandoned.

This invention relates to a process for the production of finely divided silicon dioxide by the hydrolytic conversion of a volatile silicon halide mixed with burning gases and oxygen in a flame. During the conversion, water is formed. Products having large surface areas and very high thickening effects in organic media are obtained.

It is known in the art that finely divided oxides, for example silicon dioxide or titanium dioxide, can be produced by the combustion of corresponding halides or other volatile compounds. It is also known in the art that volatile metal or metalloid compounds can be converted into the corresponding oxides either entirely or partially by way of hydrolysis. According to this method a stream of the volatile starting substance, for example, $SiCl_4$, is mixed with a combustible gas such as hydrogen or methane. The resulting mixture is reacted in an oxygen-containing atmosphere according to the following equation

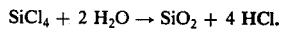

$$SiCl_4 + 2 H_2O \rightarrow SiO_2 + 4 HCl.$$

Silicon dioxide prepared according to known processes generally exhibits a relatively small particle size, e.g., in the range of 10 to 40 millimicrons, and a specific surface measured according to the BET method in the range of 50 to 380 $m^2/g$. (The BET method is an abbreviation for the Brunauer/Emmett/Teller method for the determination of the absolute size of a surface giving due consideration to unevenness). Such products are known to produce a considerable thickening effect in organic media. These numerical values generally represent an upper and lower limit to the primary particle sizes and surface areas of oxide particles prepared according to known processes. These limits generally can not be exceeded even by varying all of the reaction conditions.

Many attempts have been made to adapt the properties of silicon dioxide prepared pyrogenically to the similar properties for precipitated silicic acids. The objective has been to obtain the largest possible surface area with small primary particle size, and thereby achieve increased adsorption capability with the greatest chemical purity characteristic of pyrogenic $SiO_2$. According to the known processes for the pyrolytic conversion of silicon halides, for example, $SiF_4$ or $SiCl_4$, it was possible heretofore to obtain products whose surface areas did not substantially exceed 380 $m^2/g$ BET, and whose primary particle sizes did not lie below 10 millimicrons.

In German Pat. No. 900,339 it is disclosed, among other things, that silicochloroform can be used as a volatile organic silicon compound in a hydrolytic conversion reaction in a detonating gas flame without a statement of the conversion conditions. Up to this time, however, this proposal has not found wide acceptance in actual practice because of the difficulty in handling the silicochloroform. Another known process for the production of finely divided silicon dioxide involves treating silicon or a Si-alloy with hydrochloric acid at an elevated temperature. According to this process, a mixture of a vaporous silicon tetrachloride compound and/or silicon hydride chloride compound and hydrogen is formed. Oxygen and/or steam is introduced into this mixture, and conversion is accomplished in a flame with the silicon chloride and/or silicon tetrachloride compound being hydrolyzed to hydrogen chloride and silicon dioxide. The products obtained according to this process, however, exhibit primary particle sizes in the range of 50 to 160 millimicrons.

It will therefore be apparent that there exists a need in the art for a process for producing finely divided silicon dioxide having a surface area of more than about 380 $m^2/g$ BET. The silicon dioxide particles should have a small average primary particle size and exhibit a good thickening effect in organic media. The particles should also possess high chemical purity.

Accordingly, this invention provides a process for the production of finely divided silicon dioxide having a surface of more than about 380 $m^2/g$ BET. The process comprises reacting a volatile silicon halide in an inert gas vehicle with a gas-forming water upon combustion, e.g., hydrogen or methane and oxygen gas or air in a flame. The quantity of oxygen is sufficient for the practically complete combustion of the combustible gas. Also, the quantities of oxygen or air and combustible gas are sufficient to produce a quantity of water which will at least suffice for the hydrolysis of the volatile silicon halide. The volatile silicon halide consists essentially of trichlorosilane vapor, and the inert gas vehicle consists, e.g., of nitrogen carbon dioxide, noble gases or others. The amount of trichlorosilane vapor is about 410–565 g trichlorosilane vapor per $Nm^3$/hr total gas. The molar ratio of trichlorosilane vapor to nitrogen is about 0.5:1 – 5:1. The molar ratio of hydrogen in the combustible gas to oxygen is about 0.5:1 – 1.3:1. The resulting silicon dioxide is then separated from the other products of the reaction using conventional separating techniques.

According to this invention there is also provided finely divided silicon dioxide having a specific surface of about 380 – 650 $m^2/g$ BET, an average primary particle size of about 5 – 7 millimicrons, a bulk weight of about 20 – 120 g/l, a bulking volume of about 1,000 – 2,000 ml/100g, a silanol group density of about 80-85 A /SiOH, and capable of yielding a pH of about 3.4 – 4.4 in about 5% by weight aqueous suspension. The finely divided silicon dioxide is capable of producing a thickening effect of about 2,000 – 3,000 centipoise.

According to the process of this invention, there is obtained a finely divided silicon dioxide product having a high degree of chemical purity. The product has a large surface area and a small primary particle size. The product exhibits a high adsorption capability, and produces a considerable thickening effect in organic media.

An important aspect of this invention involves the use of trichlorosilane vapor as a volatile silicon halide together with nitrogen as the inert gas vehicle in a quantity of 410-565 g trichlorosilane per $Nm^3$/hr (grams per standard cubic meter per hour) based on the total quantity of gas in the conversion reaction. The molar ratio of trichlorosilane vapor to nitrogen is about 0.5:1 – 5:1, and that of hydrogen to oxygen is about 0.5:1 – 1.3:1.

Surprisingly, it has been found that by practicing the process of this invention, products can be obtained which possess particle sizes of less than about 10 millimicrons, for example about 5 millimicrons. The products typically possess surface areas of 380 to 650 m²/g BET or higher. The products are capable of producing a particularly high degree of thickening of organic media.

Customarily, products obtained pyrogenically from $SiCl_4$, alkylchlorosilanes or other readily volatizable silicon containing raw materials exhibit their maximum thickening effect at surface areas of 300 to 380 m²/g BET. On the other hand, the products produced from trichlorosilane according to the process of this invention have BET surface areas of about 400 to 650 m²/g or higher and exhibit thickening effects which are about 50–100% higher than the standard pyrogenic silicic acids (See Table I hereinafter).

Furthermore, the products produced according to the process of this invention are distinguishable from similar known products by an extremely low median particle size as well as by an exceedingly narrow particle size distribution (See Table II hereinafter). The products produced according to the process of this invention are generally superior to all heretofore known similar highly dispersed fillers.

It has also been found that the products of this invention are distinguishable from similar known products by a considerably lower density of silanol groups on the particle surfaces. (See Table III hereinafter).

This invention will be more readily understood by reference to the following examples. All parts, proportions, percentages and ratios are by weight unless otherwise indicated.

EXAMPLE 1

A. 31 kg/hr trichlorosilane under a nitrogen pressure of 2.0 ata (absolute atmospheric pressure) are dosed from a pressure container via a diaphragm piston pump, and are completely evaporated in a film evaporator at 120° C. A quantity of nitrogen of 3 Nm³/hr is fed through the bottom of the evaporator. The mixture consisting of trichlorosilane vapor and nitrogen emerging at the head of the evaporator is fed to one of three inlet tubes attached at the head of a cylindrical burner pipe of 23 mm inside diameter. The tubes are displaced 120° apart and tangentially to the burner pipe. 7 Nm³/hr dry hydrogen are fed through the second inlet pipe, and 44 Nm³/hr dry air through the third inlet pipe. The homogeneous gas mixture flowing out at the mouth of the burner at a speed of about 50 m/sec is fired with a slowmatch, whereupon a short sharp flame develops having a temperature of 1100° C. The combustion gases produced contain highly dispersed silicic acid as an aerogel. The hot gases then pass in a known manner through a furnace and a cooling zone, whereby coagulation of the silicic acid takes place. The silicic acid is separated in the usual manner, for example in a centrifugal separator, and is freed in the presence of water vapor at 700° C from adsorbed hydrochloric acid.

The silicic acid obtained in this manner (about 14 kg/hr) consists of more than 90% of particles whose diameters are below 10 millimicrons. The average particle size is about 6 millimicrons. The absorptive surface measured by way of nitrogen absorption according to Brunauer, Emmet and Teller (BET) is 487 m²/g. At a concentration of 1.6% of the product by weight in an unsaturated polyester resin test system, there is obtained a viscosity of the system of 2,640 centipoise.

B. 40 kg/hr silicon tetrachloride are evaporated in a known manner, and mixed in a burner of 25 mm inside diameter with 13 Nm³/hr hydrogen and 44 Nm³/hr air. The mixture emerges from the burner at a speed of about 50 m/sec. From the flame (temperature 1050° C) fired at the mouth of the burner, the mixture of the combustion gases is cooled as stated under (1A), and the silicic acid is coagulated and deacidified (14 kg/hr).

The silicic acid obtained in this manner consists of more than 90% of particles whose diameters lie between 3 and 16 millimicrons. The average particle size is about 7 millimicrons.

The adsorptive surface is 310 m²/g BET. A 1.6% dispersion in the test system mentioned under 1A results in a viscosity of only 1640 centipoise.

EXAMPLE 2

A. In the case of combustion carried out according to Example (1A) in a burner with 23 mm inside diameter with 31 kg/hr trichlorosilane, 3 Nm³/hr nitrogen, 7 Nm³/hr hydrogen and 52 Nm³/hr dry air, a product with a BET surface of 596 m²/g and a thickening effect of 3140 centipoise is obtained.

B. With a combustion carried out according to Example (1B) in a burner with 25 mm inside diameter with 40 kg/hr $SiCl_4$, 13 Nm³/hr hydrogen and 52 Nm³/hr dry air, there will be obtained a product with a BET surface of 378 m²/g and a thickening effect of 1600 centipoise.

The finely divided silicon dioxide having a large surface produced according to this invention is particularly suitable for the following applications: Increase of viscosity and thixotropy of organic media, especially unsaturated polyester lacquers, strengthing of hot vulcanizing transparent silicon rubber, the latter especially in the form of the product hydrophobed according to processes known per se. Other uses will be apparent to those skilled in the art.

The advantageous results obtained by practicing the process of this invention will be more readily apparent from an examination of the following tables

Table I

| $SiO_2$ from | Specific Surface according to BET (m²/g) | Thickening of a Polyester System with 1.6% Silicon Dioxide (centipoise) |
|---|---|---|
| $SiCl_4$ | 310 | 1640 |
|  | 336 | 1680 |
|  | 360 | 1610 |
|  | 378 | 1600 |
| $SiHCl_3$ | 405 | 2500 |
|  | 487 | 2640 |
|  | 596 | 3140 |
|  | 659 | 2090 |

Table II

| $SiO_2$ from |  | $SiCl_4$ | $SiHCl_3$ |
|---|---|---|---|
| Specific surface according to BET | m²g/ | 219    374 | 544 |
| Particle size arithmetic mean ($d_n$) | nm | 8.1     7.0 | 5.5 |
| Scatter range of the particle sizes, 90% tolerance | nm | 3–14.5    2.5–13.5 | 2.5–9.5 |

Table III

| $SiO_2$ from |  | $SiCl_4$ |  | $SiHCl_3$ |  |
|---|---|---|---|---|---|
| Specific surface according to BET | m²/g | 297 | 378 | 475 | 544 |
| Surface covering with silanol groups | A²/SiOH | 73.5 | 77.0 | 85.0 | 85.0 |
| Surface covering after 30 minutes at 110° C and $10^{-3}$ Torr | A²/ |  |  |  |  |

Table III-continued

| SiO$_2$ from | | SiCl$_4$ | | SiHCl$_3$ | |
|---|---|---|---|---|---|
| | SiOH | 65.5 | 68.5 | 85.0 | 80.5 |

In practicing the process of this invention, a volatile silicon halide consisting essentially of trichlorosilane vapor is used as one of the reactants. As used herein, the term "consisting essentially of" is intended to mean that specified components must be present, but there need not be excluded unspecified compounds which do not materially detract from the basic and novel aspect of the invention as disclosed. Also, an inert gas vehicle consisting, e.g., of nitrogen is used with the trichlorosilane vapor. Although the molar ratio of trichlorosilane vapor to nitrogen under conditions of standard temperature and pressure is about 0.5:1 – 5:1, the preferred molar ratio is about 2:1 – 3:1. A gas-forming water upon combustion, e.g., hydrogen, methane or other hydrogen-containing gases is also employed in practicing the process of this invention. The essential ingredient of this gas is hydrogen which is reacted with oxygen to form water. It will be apparent to those skilled in the art that the other components of this gas, and the amounts of such components, are not critical provided they do not materially detract from the operation of the process of this invention. Thus, the term "combustible gas" is intended to mean a combustible gas which contains free hydrogen or in compounds as an essential ingredient. Other components can be present which do not materially detract from the basic and novel characteristics of the process disclosed herein.

Oxygen gas or air is reacted with the combustible gas to form water. It will be apparent to those skilled in the art that a mixture of oxygen gas and air, e.g., oxygen enriched air, can be used in practicing this invention. The quantity of oxygen or air used must be sufficient to practically completely react with all of the hydrogen in the combustible gas. Furthermore, the quantities of oxygen or air and combustible gas must be sufficient to produce a quantity of water which will at least suffice for the hydrolysis of the volatile silicon halide. It will be understood that the quantities of these gases can be such that an excess of water will be produced upon reaction. It is also to be understood that any and all quantities of oxygen, air and combustible gas which produce the aforementioned results under the other process conditions are intended to be within the scope of this invention. The oxygen, air and combustible gas are preferably practically anhydrous.

The relative amounts and flow rates of the oxygen gas, air and combustible gas can be readily determined by one skilled in the art. For example, knowing the flow rate of the trichlorosilane vapor, one skilled in the art can readily determine the amount of water which must be produced to hydrolyze this trichlorosilane vapor. Knowing the amount of water which must be produced, one can determine the amount of oxygen gas, air, and combustible gas which must be reacted to produce this amount of water. The molar ratio of hydrogen in the combustible gas to oxygen gas or oxygen in the air is generally about 0.5:1 – 1.3:1, preferably about 0.8:1:1–1.0:1.

The amount of the trichlorosilane vapor is generally about 410 – 565 g trichlorosilane vapor per Nm$^3$/hr based on the total volume of gas in the process measured under conditions of standard temperature and pressure. Preferably, about 450–500 g trichlorosilane vapor per Nm$^3$/hr are employed.

The gases produced upon combustion of the reactants contain highly dispersed silicic acid as an aerogel. The hot gases can then be passed through a furnace and cooling zone of the type well-known in the art. See for example U.S. Pat. No. 2,990,249. After the silicic acid is coagulated by known methods, it can be separated from the combustion gases by means well-known in the art. For example, gravity settlers, cyclone separators, such as centrifugal separators, impingement separators, electrostatic separators, and separators which employ accoustical energy can be used. The techniques of phase separation are well-known to those skilled in the art. See, for example, John H. Perry, "Chemical Engineer's Handbook," Fourth Edition, McGraw-Hill, Inc., N.Y. (1963) pp. 18-82 through 18-88.

Equipment for conducting the combustion reaction in a flame is also well-known in the art; see, for example, U.S. Pat. No. 2,990,249. It will, of course, be recognized that the reaction time in the flame is of extremely short duration because of the nature of the process.

The finely divided silicon dioxide produced according to the process of this invention has a specific surface of greater than about 380 m$^2$/g BET. Typically, the specific surface area can be up to about 650 m$^2$/g BET or even higher. Best thickening efficiency in organic media will be obtained with a specific surface of about 480–600 m$^2$/g BET.

What is claimed is:

1. In a process for the production of finely divided silicon dioxide having a surface area of more than about 380 m$^2$/g BET which comprises converting a volatile halogen-containing inorganic silicon compound in an inert gas vehicle with a hydrogen-containing gas capable of forming water upon combustion and oxygen gas or air in a flame, whereby the quantity of oxygen is sufficient for the complete combustion of the water-forming gas, and whereby the quantities of oxygen or air and water-forming gas are sufficient to produce a quantity of water which will at least suffice for the hydrolysis of the silicon compound, said inert gas vehicle selected from the group consisting of nitrogen, carbon dioxide or noble gases, the improvement wherein said inorganic silicon compound is trichlorosilane vapor in an amount of about 410–565 g trichlorosilane vapor per Nm$^3$/hr total gas the molar ratio of trichlorosilane vapor to inert gas vehicle being about 0.5:1–5:1, the molar ratio of hydrogen in the combustible gas to the oxygen being about 0.5 : 1 – 1.3 : 1, and separating the resulting silicone dioxide from other reaction products, said silicone dioxide having an enhanced thickening effect in organic media.

2. Process according to claim 1 in which the silicon dioxide has a specific surface of about 380–650 m$^2$/g BET, an average primary particle size of about 5–7 millimicrons, a bulk weight of about 20–120 g/l, a bulking volume of about 1,000–2,000 ml/100g, and a silanol group density of about 80–85 A/SiOH.

3. Process according to claim 2 wherein said silicon dioxide is capable of yielding a pH of about 3.4 to about 4.4 in about 5% by weight aqueous suspension of said silicon dioxide.

4. Process according to claim 3 in which the BET surface is about 480 to about 600 m$^2$/g.

5. Process according to claim 2 wherein said silicon dioxide has a particle size distribution of about 2.5 to about 9.5 millimicrons.

6. Process according to claim 1 in which the BET surface is about 400–650 m²/g.

7. Process according to claim 1 in which the hydrogen-containing gas is hydrogen or methane.

8. Process according to claim 1 in which the molar ratio of hydrogen in the combustible gas to oxygen gas or oxygen in the air is about 0.8 : 1 – 1.0 : 1.

9. Process according to claim 1 in which the amount of trichlorosilane vapor is about 450–500 g trichlorosilane vapor per Nm³/hr.

10. Process according to claim 1 in which the BET surface is about 480–600 m²/g.

11. Process according to claim 1 in which the silicon dioxide is separated from combustion gases in a centrifugal separator.

* * * * *